(12) United States Patent
Dananche et al.

(10) Patent No.: US 8,846,787 B2
(45) Date of Patent: Sep. 30, 2014

(54) HIGH CURING INDUCING SURFACE APPLIED SETTING RETARDER

(75) Inventors: Eric Dananche, Courlaoux (FR); Dany Vincent, Chateaurenaud (FR)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/522,650

(22) PCT Filed: Jan. 17, 2011

(86) PCT No.: PCT/EP2011/000171
§ 371 (c)(1),
(2), (4) Date: Sep. 14, 2012

(87) PCT Pub. No.: WO2011/088980
PCT Pub. Date: Jul. 28, 2011

(65) Prior Publication Data
US 2013/0005860 A1 Jan. 3, 2013

(30) Foreign Application Priority Data

Jan. 20, 2010 (EP) .................................... 10250090

(51) Int. Cl.
*C04B 41/48* (2006.01)
*C08K 5/17* (2006.01)
*C08K 5/55* (2006.01)

(52) U.S. Cl.
USPC .......................................................... 524/2

(58) Field of Classification Search
USPC ....................................................... 524/5, 2
See application file for complete search history.

(56) References Cited

U.S. PATENT DOCUMENTS

| | | | |
|---|---|---|---|
| 2,578,652 A | 12/1951 | Cassaday | |
| 2,928,752 A | 3/1960 | Felletschin et al. | |
| 3,189,469 A | 6/1965 | Littler et al. | |
| 3,403,201 A | 9/1968 | Adrian et al. | |
| 3,573,942 A | 4/1971 | Wassenberg et al. | |
| 4,004,066 A | 1/1977 | DeArdo | |
| 4,205,040 A | 5/1980 | Aoyama et al. | |
| 4,367,180 A | 1/1983 | Rouy et al. | |
| 4,656,005 A | 4/1987 | Arpin | |
| 4,748,788 A | 6/1988 | Shaw et al. | |
| 5,151,456 A | 9/1992 | Elias et al. | |
| 5,441,677 A | 8/1995 | Phillips, Sr. | |
| 5,837,078 A | 11/1998 | Lowe | |
| 6,648,963 B2 | 11/2003 | Pasquier et al. | |
| 7,037,367 B2 | 5/2006 | Mauchamp et al. | |
| 2003/0110988 A1 | 6/2003 | Pasquier et al. | |
| 2006/0230987 A1 | 10/2006 | Burgals et al. | |
| 2009/0162540 A1 * | 6/2009 | Golovkova et al. | 427/154 |

FOREIGN PATENT DOCUMENTS

| | | |
|---|---|---|
| CN | 101298373 | 5/2008 |
| JP | 6047508 | 6/1994 |
| JP | 11262908 | 9/1999 |

OTHER PUBLICATIONS

Machine translation of JP 11-262908. Sep. 1999.*
Machine translation of CN 101,298,373. Nov. 2008.*
Bonneau, European Search Report for EP10250090, dated May 17, 2010, 2 pages.
The Euclid Chemical Company, product data "Concrete Surface Retarders/Formula F & G for Exposed Aggregate Surfaces", 2 pages, Apr. 2008.
The Euclid Chemical Company, product data "Tamms Surface Retarder/Concrete Set Retarder for Exposed Aggregate Finish", 2 pages, Jan. 2007.
Sierra Corporation, product data "TK-6000 Concrete Surface Retarder as Used to Create Horizontal Aggregate Surfaces", 2 pages, Dec. 1999.
W. R. Meadows, Inc, product data "Top-Stop Spray-Applied, Water-Soluble Surface Retarder", Dec. 2008, 2 pages.
Rockbond, product data "Rockbond Vertical Surface Retarder—Plus Water based vertical concrete surface retarder", Jan. 2008, 2 pages.

* cited by examiner

*Primary Examiner* — John Uselding
(74) *Attorney, Agent, or Firm* — Craig K. Leon

(57) ABSTRACT

Exemplary methods and compositions of the invention for retarding the surface of a hydratable cementitious composition comprise the use of a non-bituminous cationic emulsion comprising at least one curing compound comprising an acrylic polymer, a paraffin, or a mixture thereof, to hinder evaporation of water; at least one set retarder; and at least one cationic surfactant.

5 Claims, No Drawings

HIGH CURING INDUCING SURFACE APPLIED SETTING RETARDER

This is an application filed Sep. 14, 2012, under 35 U.S.C. §371 based on World Patent Application No. PCT/EP11/00171, filed Jan. 17, 2011, based on European Patent Application No. 1025090.7, filed Jan. 20, 2010.

FIELD OF THE INVENTION

The present invention relates to the treatment of hydratable cementitious materials, and more particularly to a composition and method for retarding the surface of concrete while at the same time achieving high curing properties.

BACKGROUND OF THE INVENTION

Various methods are known for retarding the surface of mortar or concrete materials to etch the surface, or to expose aggregate at the surface, of such mortar or concrete materials.

In U.S. Pat. No. 7,037,367, Mauchamp et al. disclosed the use of vegetable or mineral oil-based surface retarders for forming wet film coatings on mortar or concrete to provide the retarder active components with a favorable opportunity to penetrate into the surface of the mortar or concrete. Maintaining this penetrating ability facilitated the ability of the surface retarder to etch the treated surface of the mortar or concrete and/or to expose the aggregate on the surface.

In US Publication No. 2003/011998 which issued as U.S. Pat. No. 6,648,963, Pasquier et al. disclosed surface deactivating compositions for concrete or mortar, comprising a retardant, water, and a rheology modifying agent of the HASE type (emulsion, soluble in alkali, of a polymer with hydrophobic modification). A retardant such as carboxylic acid was incorporated into the HASE material at greater than or equal to 0.5% by weight. The process of application consisted in applying this deactivating composition in proportions onto the mortar or concrete surface, then washing the surface after a predetermined period with water. Pasquier et al. also described the use of polydimethylsiloxane, a nonionic surfactant, in their compositions.

A similar approach was disclosed in US Publication No. 20060230987 A1, owned by Sika, wherein Burgals et al. disclosed the use of a similar type of HASE type acrylic resin as a rheology modifying agent in surface-deactivating compositions for concrete or mortar. Their compositions comprised at least one setting retarder and at least one nonionic surfactant, and a process for the application of such a composition. They also taught that their surface deactivating composition could also contain an oil-in-water emulsion, that the use of a cutting oil with the rheology modifying agent made it possible to achieve optimum effectiveness as a curing product, and that the oil could be a "light liquid paraffin." See Sections 0036-0037.

It is still common practice, particularly in Europe, to wait around for 15-24 hours before washing off the surface of a concrete onto which a set retarder has been applied. The surface retarders, which are of a very high quality, will require a long waiting time before they can be washed off, and the washing will usually take place on the next day. However, the present inventors realized that surface retarding compositions currently in use tend to have poor curing performance and leave cracks in concrete surfaces.

Hence, the present inventors believe that a new composition and method are needed for achieving concrete surface retarders having high curing performance.

SUMMARY OF THE INVENTION

The present invention provides a novel method and composition for retarding the setting of a mortar or concrete surface while at the same time conferring excellent curing performance. The surface of the mortar or concrete may be retarded, either to etch an image or a pattern into the surface or to expose aggregate at the surface of the mortar or concrete.

The present invention, however, departs from the prior art by employing cationic surfactants to achieve cationic emulsions which have unexpectedly shown to provide excellent curing performance.

An exemplary method for treating the surface of a concrete comprises: providing a hydratable cementitious composition comprising a hydratable cementitious binder, water mixed with said hydratable cementitious binder in an amount sufficient to initiate hydration thereof, and at least one aggregate comprising sand, crushed gravel, stones, or mixture thereof, said hydratable cementitious composition having at least one external surface; and applying onto said at least one external surface of said hydratable cementitious composition surface a liquid coating composition which is a cationic emulsion having an aqueous carrier with substantially no bituminous content, said cationic emulsion comprising: (a) at least one curing compound comprising an acrylic polymer, a paraffin wax, or mixture thereof, said at least one curing compound being dispersed within said cationic emulsion and operative thereby to hinder evaporation of water from said hydratable cementitious composition surface after said liquid coating composition has been applied onto said surface; (b) at least one component operative to retard setting of said hydratable cementitious binder after said liquid coating composition has been applied onto said surface; and (c) at least one cationic surfactant operative to disperse said at least one curing compound within said aqueous carrier of said liquid coating composition.

An exemplary coating composition of the invention thus comprises the above-mentioned cationic emulsion having an aqueous carrier with substantially no bituminous content, said cationic emulsion comprising components (a) through (c) as previously described above.

In further exemplary methods and compositions of the invention, cationic emulsions of both an acrylic polymer and paraffin wax were found to improve significantly the curing performance of the acrylic alone, even when relatively smaller amounts of paraffin wax were used.

In still further exemplary methods and compositions of the invention, it has also been surprisingly discovered that addition of cationic surfactants to commercially available cationic acrylic emulsions has been found to improve the curing performance when the liquid coating composition is applied on fresh cementitious surfaces.

Other features and advantages of the invention are described in further detail hereinafter.

DETAILED DESCRIPTION OF EXEMPLARY EMBODIMENTS

As used herein, the terms "cement" and "cementitious composition" (which are synonymous with "cement composition") are understood to refer to pastes, mortars, and concrete compositions comprising a hydratable cement binder. The terms "paste", "mortar" and "concrete" are terms of art: "pastes" are mixtures composed of a hydratable cement binder (usually, but not exclusively, Portland cement, masonry cement, or mortar cement, and this binder may also include limestone, hydrated lime, fly ash, granulated blast furnace slag, pozzolans, and silica fume or other materials commonly included in such cements) and water; "mortars" are pastes additionally including fine aggregate (e.g., sand), and "concretes" are mortars additionally including coarse aggregate (e.g., crushed gravel, stone).

The cementitious compositions tested in this invention may be formed by mixing required amounts of certain materials, e.g., a hydratable cement, water, and fine and/or coarse aggregate, as may be applicable to make the particular cement composition being formed.

The term "fresh" mortar or concrete is understood by those of ordinary skill to refer to hydratable cementitious compositions wherein water has been combined with cementitious binder to initiate the hydration reaction leading to the hardening of the material.

As summarized above, an exemplary method of the invention for treating the surface of a hydratable cementitious composition, comprises: providing a hydratable cementitious composition comprising a hydratable cementitious binder, water mixed with the hydratable cementitious binder (e.g., Portland cement with or without limestone, fly ash, slag, or pozzolans or other materials typically included in Portland cement) in an amount sufficient to initiate hydration of the cementitious binder, and at least one aggregate comprising sand, crushed gravel, stones, or mixture thereof, the hydratable cementitious composition having at least one external surface; and applying onto the at least one external surface of the hydratable cementitious composition surface a liquid coating composition which is a cationic emulsion having an aqueous carrier with substantially no bituminous content, the cationic emulsion comprising: (a) at least one curing compound comprising an acrylic polymer, a paraffin wax, or mixture thereof, the at least one curing compound being dispersed within the cationic emulsion and operative thereby to hinder evaporation of water from the hydratable cementitious composition surface after the liquid coating composition has been applied onto the surface; (b) at least one component operative to retard setting of the hydratable cementitious binder after the liquid coating composition has been applied onto the surface; and (c) at least one cationic surfactant operative to disperse the at least one curing compound within the aqueous carrier of the liquid coating composition.

In addition to the exemplary method, the invention also provides an exemplary surface retarding composition having excellent curing properties, and thus comprises components (a) through (c) as summarized above and described in further detail hereinafter.

The liquid coating composition may be spray-applied or applied by brush or trowel onto one or more surfaces of the hydratable cementitious composition. If the cementitious composition is a flooring or paving material, then spray-application is perhaps most convenient. After a period of time, the liquid coating composition can be removed from the surface. A pressurized jet of water can be used to remove the coating composition, after it has solidified, from the surface(s) of the mortar or cement.

Alternatively, the liquid coating composition can be spray-applied or brushed onto the inner surfaces of a mold for forming mortar or concrete into a structure, and the liquid coating composition allowed to harden into a solid film or layer. After the mortar or concrete (e.g., concrete paver unit or other pre-cast structure) is removed from the mold, the solidified coating material can be removed from the mortar, concrete, and/or mold using a pressurized stream of water.

High pressure washers, such that type used by home owners to clean houses or walkways, or to clean automobiles, can be used for purposes of removing, from the mortar, cement, or form, the solidified membrane formed from the liquid coating composition. The water jet pressure may vary from 50 to 200 kg per square meter, and is ideally about 150 kg/m$^2$.

The exemplary methods and liquid coating compositions of the invention are said to have "substantially no bituminous content," to distinguish the inventive liquid coating compositions of the present invention from cationic asphaltic emulsions used in paving roads. The phrase "substantially no bituminous content" is intended to refer to zero percent to no more than 1% by total weight of asphalt or bitumen in the liquid coating composition, and preferably none or no more than 0.2% of the liquid coating composition. If more than 1% of bitumen or asphalt were included in the liquid coating compositions of the invention, this could make removal of the coating from the cementitious surface difficult when using a pressurized water stream.

In exemplary methods and compositions of the invention, the at least one curing compound refers to an acrylic polymer, a paraffin wax, or mixture thereof, in an amount of 30%-70% and more preferably 40%-60%, within the cationic emulsion, based on total weight of the liquid coating composition. The term "acrylic" as used herein shall be understood to mean and include salt form (i.e., "acrylate"); and, similarly, the use of the term "acrylate" shall be understood to mean and include the acid form. The term "acrylic polymer" as used herein shall mean and refer to acrylic monomers (pre-polymers) which polymerize to form an acrylic or (poly)acrylic polymer.

Acrylic emulsions and paraffin emulsion are known in the art for sealing surfaces of wood, concrete, and other materials, and may be used or adapted for the purposes of the present invention.

Exemplary paraffin emulsions should preferably contain a paraffin having a melting point in the range of 30-80 degrees Celcius, and more preferably in the range of 40-60 degrees Celcius.

In other exemplary methods and compositions of the invention, the inventors discovered that the addition of a small amount of cationic paraffin emulsion to a cationic acrylic emulsion greatly improved the curing performance of the latter, compared to the acrylic emulsion alone.

Exemplary cationic surfactants that are contemplated for use in the invention include salts of a primary, secondary, or tertiary amines; a salt of di-amine, tri-amine, or poly-amine (which may optionally be ethoxylated); a quaternary ammonium; an amine oxide; an amino-acid; an amphoteric compound, an ether-amine; an amide; a borate of an alkylene amide; or mixtures thereof. The relative amount of the cationic surfactants may be as desired in the particular emulsion. The amounts of cationic surfactants used in the invention, based on percentage of total weight of the liquid coating composition, are anywhere from 1% to 10% or more. The present inventors discovered that incorporating additional cationic surfactants into acrylic and/or paraffin emulsion can help to improve the curing performance of the coating significantly, and thus it is preferred to have at least 3% of cationic surfactant in the coating composition.

Conventional surface retarding actives are contemplated for use in the liquid coating compositions of the present invention. These may be used individually or in combination depending upon the preferences of the user, and are typically used in the total amount of 1.0% to 20.0% by total weight of the coating composition. Exemplary retarding actives include carboxylic acids (e.g., malic, tartaric, citric, gluconic, hepta-gluconic) and their salt form (e.g., sodium, potassium, calcium). Conventional retarders also include sugars, such as sucrose, roferose, dextrose, maltose, lactose, xylose, fructose, mannose, or glucose. Hence, in exemplary methods of the invention, the set retarder can include carboxylic acid, malic acid, tartaric acid, citric acid, gluconic acid, heptagluconic acid, or their salts, or mixtures thereof. Preferred are citric acid and sucrose.

The exemplary cationic surfactant operative to disperse said at least one curing compound within the aqueous carrier of said emulsion may be an an amine, an amine oxide, an ether amine, an amino acid, an amide, a quaternary ammonium, a borate of an alkylene amide, the salts of any of the foregoing, or a mixture thereof. In preferred embodiments, the at least one cationic surfactant can be a primary amine, a secondary amine, a tertiary amine, or mixture thereof. The cationic surfactant may be a diamine, a triamine, a polyamine, or mixture thereof.

Liquid coating compositions may further contain oils, such as vegetable oils and mineral oils.

The exemplary compositions of the invention may also contain finely divided particulate material as fillers. For example, the amount of such particulate materials can be between 1-60% and more preferably 10-50%.

The term "finely divided particulate material" means and refers to granules, particles, powders, dust, or ground material. Such particulate material, for example, can include calcium carbonate, sand, silicate sand, cement, talc, titanium dioxide, carbon black, slate dust, granite dust, clay, iron oxides, cobalt oxide, zinc oxide, silicon dioxide, mica, clay (e.g., kaolin), barium sulfate, sodium silico-aluminate, alumina, barium carbonate, dolomite (which is a carbonate of calcium and magnesium, $CaMg(CO_3)_2$), magnesium carbonate, magnesium oxide, kieslguhr (diatomaceous earth), or mixtures of any of the foregoing. The total filler content may be, for example, 1-60% based on total weight of the liquid coating composition. The size of the finely divided particulate materials can be selected depending on personal preference and the nature of spray equipment used.

Other exemplary finely divided particulates can include organic materials such as: wood flour, cereal flour, gums, corn starch, wheat starch, rice starch, pee starch, carrageenans, alginates, and mixtures thereof, in the amount of 1-60% based on total weight of the hot melt coating composition.

Still further exemplary finely divided particulates useful in the invention can include chemically modified derivatives of finely divided vegetable raw materials such as modified cellulose, gluten, hydroxyethyl cellulose, hydroxypropyl cellulose, carboxymethylcellulose, hydroxyethylcellulose, acetate modified starch, phosphate modified starch, hydroxypropyl modified starch, adipate modified starch, modified gums, and mixtures thereof.

Still further exemplary coating compositions of the invention may also include one or more pigments, colorants, or dyes, such as titanium dioxide, iron oxide, chromium oxide, zinc oxide, magnesium oxide, or other pigments or colorants, in an amount of 0-30% by total weight of the composition. It is desirable to employ at least one pigment, colorant, or dye (and preferably white pigments that are sunlight reflective, e.g., titanium dioxide) such that an applicator can visually confirm, such as during a spray application, that a particular targeted cementitious surface has been treated with the surface retarder composition.

Other exemplary coating compositions of the invention may additionally include other components, such as sorbitol, boric acid (or its salt), alkylphosphates, proteins, and casein. These further components may be used for affecting various properties of the coating compositions, such as rheology, viscosity, and/or surface tension. Accordingly, further embodiments include one or more rheology modifiers and/or viscosity modifiers.

Exemplary methods of the invention comprise applying a liquid coating composition to the surface of a fresh mortar or concrete to form a coating layer, or, alternatively, to the inner surfaces of a form for molding fresh mortar or concrete, and allowing the coating to harden at ambient temperature. The coating composition may be applied by roller or brush or other mechanical means, but is preferably spray-applied directly to the surface to be treated. After the mortar or concrete cures (and, in the latter case, after it is removed from the mold), the hardened coating may be removed from the surface using a pressure-washer or water hose to reveal a rough surface or aggregates within the mortar or concrete composition.

While the invention is described herein using a limited number of specific embodiments, these embodiments are not intended to limit the scope of the invention as otherwise described and claimed herein. Modification and variations from the described embodiments exist. More specifically, the following examples are given as specific illustrations of embodiments of the claimed invention. It should be understood, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% ... 50%, 51%, 52%, ... 95%, 96%, 97%, 98%, 99%, or 100%. Moreover, any numerical range represented by any two values of R, as calculated above, is also specifically disclosed.

EXAMPLE I

Various coating formulations (otherwise referred to herein as curing compositions) were made by combining commercially-available acrylic polymer emulsions, having either an anionic/non-ionic or a cationic surfactant, with water and a conventional retarding agent (e.g., citric acid or sodium citrate). These curing compositions were tested for curing performance in accordance with French standard NF-18-371.

French standard NF-18-371 pertains to the use of two concrete samples (water/cement of about 0.42) which are kept at 30 degrees C. at 65% air moisture. One sample is cured without using the curing composition, while the second sample contained the curing composition. Curing performance was measured in terms of the weight lost by water evaporation, and a "protection coefficient" is the ratio based on lost water in the treated sample compared to lost water in the untreated sample. Thus, a protection coefficient of 100% would refer to the ability of a curing compound to retain 100% of the water in the concrete. A higher protection coefficient means better curing performance.

In the samples described below, the amounts of components for making the various coating compositions are expressed in terms of weight percent based on total weight of the liquid coating composition, and this usually involved 50% by weight of the commercially-available acrylic emulsion (50%), water (34%-44%), retarder (6%), and other components, as follows:

A coating composition (Sample 1) was made by combining an acrylic emulsion comprising an anionic/non-ionic surfactant (commercially available from Rohm & Haas under the trade name PRIMAL® AC339) with water and retarder in a mixture of 50/44/6, respectively, in terms of weight percentage.

A second coating composition (Sample 2) was made by combining an acrylic emulsion comprising an anionic/non-ionic surfactant (commercially available from Scott Bader under the trade name TEXICRYL® 13,013) with water and retarder in a mixture of 50/44/6, respectively, in terms of weight percentage.

A third coating composition (Sample 3) was made by using only an anionic surfactant (Cocoate Polyethylene Glycol 600 available from Rohm & Haas) with water and retarder in a mixture of 30/64/6, respectively, in terms of weight percentage.

amount of a cationic surfactant (tallow quaternary ammonium salt available from Arkema under the trade name NORAMIUM® MS50) in a mixture of 50/41/6/3, respectively, in terms of weight percentage.

A ninth coating composition (Sample 9) was made by combining an acrylic emulsion comprising a cationic surfactant (commercially available from Dow Chemicals under the trade name U418®) with water, retarder, and a cationic paraffinic emulsion (available from Michelman under the trade name ME 70350AE) in a mixture of 50/39/6/5, respectively, in terms of weight percentage.

A tenth coating composition (Sample 10) was made by combining an acrylic emulsion comprising a cationic surfactant (commercially available from Dow Chemicals under the trade name U418®) with water, retarder, and a cationic paraffinic emulsion (available from Michelman under the trade name ME 70350AE) in a mixture of 50/34/6/10, respectively, in terms of weight percentage.

Curing performances of the samples are summarized in Table 1.

TABLE 1

| | Sample No. | | | | | | | | | |
|---|---|---|---|---|---|---|---|---|---|---|
| | 1 | 2 | 3 | 4 | 5 | 6 | 7 | 8 | 9 | 10 |
| Anionic/non-ionic acrylic emulsion | 50 | 50 | | | | | | | | |
| Cationic acrylic emulsion | | | | 50 | 50 | 50 | 50 | 50 | 50 | 50 |
| Water | 44 | 44 | 64 | 44 | 44 | 44 | 44 | 41 | 39 | 34 |
| Retarder | 6 | 6 | 6 | 6 | 6 | 6 | 6 | 6 | 6 | 6 |
| Anionic surfactant | | | 30 | | | | | | | |
| Cationic paraffin emulsion | | | | | | | | | 5 | 10 |
| Cationic surfactant | | | | | | | | 3 | | |
| Total components (weight %) | 100 | 100 | 100 | 100 | 100 | 100 | 100 | 100 | 100 | 100 |
| Performance Coefficient at 6 hours (30° C., 65% moisture) expressed as percentage | 30 | 46 | 40 | 36 | 51 | 35 | 75 | 87 | 90 | 98 |
| Performance Coefficient at 24 hours (30° C., 65% moisture) expressed as percentage | 25 | 35 | 28 | 26 | 41 | 19 | 76 | 85 | 78 | 93 |

A fourth coating composition (Sample 4) was made by combining an acrylic emulsion comprising a cationic surfactant (commercially available from Interpolymer under the trade name SYNTRAN® FX30-4) with water and retarder in a mixture of 50/44/6, respectively, in terms of weight percentage.

A fifth coating composition (Sample 5) was made by combining an acrylic emulsion comprising a cationic surfactant (commercially available from Interpolymer under the trade name SYNTRAN® 6301) with water and retarder in a mixture of 50/44/6, respectively, in terms of weight percentage. A sixth coating composition (Sample 6) was made by combining an acrylic emulsion comprising a cationic surfactant (commercially available from Interpolymer under the trade name SYNTRAN® FX30-20) with water and retarder in a mixture of 50/44/6, respectively, in terms of weight percentage.

A seventh coating composition (Sample 7) was made by combining an acrylic emulsion comprising a cationic surfactant (commercially available from Dow Chemicals under the trade name U418®) with water and retarder, in a mixture of 50/44/6, respectively, in terms of weight percentage.

An eight coating composition (Sample 8) was made by combining an acrylic emulsion comprising a cationic surfactant (commercially available from Dow Chemicals under the trade name U418®) with water, retarder, and an additional The foregoing data indicate that the curing performances of the anionic/non-ionic acrylic emulsions (Samples 1 and 2) were, on average, lower than that of the cationic acrylic emulsions (Samples 4-10) at both 6 and 24 hours. Curing performances of Samples 1 and 2 were on average similar to that of Sample 3, which contained only 30% of an anionic surfactant without any acrylic polymer emulsion.

On the other hand, the cationic acrylic emulsions (Samples 4-7) showed improved curing performance at 6 and 24 hours on average.

Samples 7 and 8 showed that curing performance of the cationic acrylic emulsion could be enhanced by replacing some of the water with a cationic surfactant which in this case was 3% of tallow quaternary ammonium salt. Hence, preferred methods and coating compositions of the invention involve at least 3% amount by total weight of a cationic surfactant.

Samples 9 and 10 indicated that curing performance of the cationic acrylic emulsion could be enhanced by replacing a small portion of the acrylic emulsion with a cationic paraffin emulsion. Hence, in preferred methods and coating compositions of the invention, cationic acrylic emulsions are combined with at least 5% and more preferably at least 10% (total weight of liquid composition) of a cationic paraffin emulsion.

EXAMPLE 2

Various coating formulations (otherwise referred to herein as curing compositions) were made by combining commercially-available paraffin polymer emulsions, containing either an anionic/non-ionic or a cationic surfactant, with water and a conventional retarding agent (e.g., citric acid or sodium citrate).

These curing compositions were tested for curing performance in accordance with French standard NF-18-371, which was explained above.

Thus, a coating composition (Sample 11) was made by combining a paraffin emulsion comprising an anionic/non-ionic surfactant (commercially available from Bärlocher under the trade name CERAXOLIN® N329) with water and retarder in a mixture of 50/44/6, respectively, in terms of weight percentage.

Another coating composition (Sample 12) was made by combining a paraffin emulsion comprising an anionic/non-ionic surfactant (commercially available from Keim Additec under the trade name ULTRALUBE® E329) with water and retarder in a mixture of 50/44/6, respectively, in terms of weight percentage.

Another coating composition (Sample 13) was made by combining a paraffin emulsion comprising an anionic/non-ionic surfactant (commercially available from Süd Chemie under the trade name WULKONYL® RT50) with water and retarder in a mixture of 50/44/6, respectively, in terms of weight percentage.

Another coating composition (Sample 14) was made by combining a paraffin emulsion comprising an cationic surfactant (commercially available from Repsol under the trade name REDEMULS® C108) with water and retarder in a mixture of 50/44/6, respectively, in terms of weight percentage.

Another coating composition (Sample 15) was made by combining a paraffin emulsion comprising a cationic surfactant (commercially available from Repsol under the trade name VUKONYL® KN50) with water and retarder in a mixture of 50/44/6, respectively, in terms of weight percentage.

Another coating composition (Sample 16) was made by combining a paraffin emulsion comprising an cationic surfactant (commercially available from Michelman under the trade name ME 70350AE™) with water and retarder in a mixture of 50/44/6, respectively, in terms of weight percentage.

Another coating composition (Sample 17) was made by using less of the paraffin emulsion described for Sample 16 and more water, with retarder still at 6%, in a mixture of 30/64/6, respectively, in terms of weight percentage.

Another coating composition (Sample 18) was made by combining the same cationic paraffin emulsion used in Sample 16, with water, retarder, and also a small amount (2%) of a fatty amine (e.g., dioleate diamin C18) replacing some of the water, in a mixture of 50/42/6/2, respectively, in terms of weight percentage.

Another coating composition (Sample 19) was made similar to Sample 18 by replacing a large portion of the cationic paraffin emulsion with a fatty acid of a diamine (e.g., dioleate diamin C18). Thus, the relative amount of cationic paraffin emulsion, water, retarder, and fatty acid of a diamine was 30/62.5/6/1.5, respectively, in terms of weight percentage.

Curing performances of the samples are summarized in Table 2.

TABLE 2

| | Sample No. | | | | | | | | |
|---|---|---|---|---|---|---|---|---|---|
| | 11 | 12 | 13 | 14 | 15 | 16 | 17 | 18 | 19 |
| Anionic/non-ionic paraffin emulsion | 50 | 50 | 50 | | | | | | |
| Cationic paraffin emulsion | | | | 50 | 50 | 50 | 30 | 50 | 30 |
| Water | 44 | 44 | 44 | 44 | 44 | 44 | 64 | 42 | 62.5 |
| Retarder | 6 | 6 | 6 | 6 | 6 | 6 | 6 | 6 | 6 |
| Fatty acid of diamine | | | | | | | | 2 | 1.5 |
| Total components (weight %) | 100 | 100 | 100 | 100 | 100 | 100 | 100 | 100 | 100 |
| Performance Coefficient at 6 hours (30° C., 65% moisture) expressed as percentage | 60 | 62 | 55 | 91 | 90 | 95 | 93 | 100 | 98 |
| Performance Coefficient at 24 hours (30° C., 65% moisture) Expressed as percentage | 50 | 49 | 49 | 80 | 82 | 87 | 85 | 98 | 92 |

The foregoing data indicates that the curing performance of the anionic/non-ionic paraffin emulsions (Samples 11-13) was, on average, much lower than that of the cationic paraffin emulsions (Samples 14-19) generally at both 6 and 24 hours. The performance coefficients of the cationic paraffin emulsions were all seen to be 90% and above.

The inventors were also surprised to discover that when approximately 20% of the cationic paraffin emulsion was replaced by water, the curing performance did not significantly deteriorate. For example, Sample 17 contained 20% less of the cationic paraffin emulsion than did Sample 16, and the performance coefficient at 6 hours was seen to drop from 95% to 93% and the performance coefficient at 24 hours was sent drop from 87% to 85%.

Enhanced curing performance was seen when a fatty acid of a diamine was incorporated (compare Samples 16 and 18), and this improved performance was particularly notable in the samples wherein the cationic paraffin emulsion was decreased from 50% to 30% (compare Samples 17 with Sample 19). Hence, preferred methods and coating compositions of the present invention further comprise the use of a curing compound, such as a fatty acid of a diamine.

The foregoing examples and embodiments are presented for illustrative purposes only and not intended to limit the scope of the invention.

We claim:

1. A method for treating the surface of a hydratable cementitious composition, comprising:
   providing a hydratable cementitious composition comprising a hydratable cementitious binder, water mixed with said hydratable cementitious binder in an amount sufficient to initiate hydration thereof, and at least one aggregate comprising sand, crushed gravel, stones, or mixture thereof, said hydratable cementitious composition having at least one external surface; and
   spraying onto said at least one external surface of said hydratable cementitious composition surface a liquid coating composition which is a cationic emulsion having an aqueous carrier with substantially no bituminous content, said cationic emulsion comprising:
   (a) at least one curing compound comprising a paraffin wax dispersed within said cationic emulsion in an amount of 30%-70% based on total weight of said liquid coating composition and operative thereby to hinder evaporation of water from said external surface of the hydratable cementitious composition after said liquid coating composition is sprayed onto said surface;
   (b) at least one component for retarding setting of said hydratable cementitious binder after said liquid coating composition comprising said paraffin wax dispersed within said cationic emulsion is sprayed onto said surface; and
   (c) at least one cationic surfactant for dispersing said paraffin wax within said cationic emulsion of said liquid coating composition, said at least one cationic surfactant comprising a salt of a primary, secondary, and tertiary amine; a salt of a di-amine, tri-amine, or poly-amine; or a mixture thereof.

2. The method of claim 1 wherein said at least one cationic surfactant comprises a salt of a primary, secondary, and tertiary amine.

3. The method of claim 1 wherein said at least one component for retarding setting of said hydratable cementitious binder after said coating composition has been applied onto said surface is present in said coating composition in an amount of 1%-20% by total weight of said coating composition.

4. The method of claim 3 wherein said at least one component for retarding setting of said hydratable cementitious binder after said coating composition has been applied onto said surface comprises a carboxylic acid or its salt, malic acid or its salt, tartaric acid or its salt, citric acid or its salt, gluconic acid or its salt, heptagluconic acid or its salt, or a mixture thereof.

5. The method of claim 4 wherein said at least one component for retarding setting of said hydratable cementitious binder after said coating composition has been applied onto said surface is a citric acid or its salt.

* * * * *